US012642159B2

(12) United States Patent
Hiddema et al.

(10) Patent No.: US 12,642,159 B2
(45) Date of Patent: Jun. 2, 2026

(54) METHOD TO CULTIVATE A PIECE OF FARMLAND WITH AN AUTONOMOUS AGRICULTURAL VEHICLE AND A VEHICLE TO APPLY THE SAID METHOD

(71) Applicant: Agxeed Holding B.V., Oirlo (NL)

(72) Inventors: Joris Jan Hiddema, Grubbenvorst (NL); Laurentius Hubertus Margaretha Schmitz, Mariahoop (NL)

(73) Assignee: Agxeed Holding B.V., Oirlo (NL)

( * ) Notice: Subject to any disclaimer, the term of this patent is extended or adjusted under 35 U.S.C. 154(b) by 44 days.

(21) Appl. No.: 18/843,359

(22) PCT Filed: Mar. 27, 2023

(86) PCT No.: PCT/NL2023/050152
§ 371 (c)(1),
(2) Date: Sep. 3, 2024

(87) PCT Pub. No.: WO2023/191616
PCT Pub. Date: Oct. 5, 2023

(65) Prior Publication Data
US 2025/0194451 A1 Jun. 19, 2025

(30) Foreign Application Priority Data
Mar. 28, 2022 (NL) ..................................... 2031415

(51) Int. Cl.
*A01B 69/00* (2006.01)
*A01B 69/04* (2006.01)
*B62D 55/30* (2006.01)

(52) U.S. Cl.
CPC ........... *A01B 69/008* (2013.01); *B62D 55/30* (2013.01)

(58) Field of Classification Search
None
See application file for complete search history.

(56) References Cited

U.S. PATENT DOCUMENTS

| | | | |
|---|---|---|---|
| 4,854,650 A | 8/1989 | Getz et al. | |
| 5,373,909 A | 12/1994 | Dow et al. | |
| 6,095,254 A * | 8/2000 | Homburg ........... | A01D 41/1278 |
| | | | 172/6 |
| 8,985,250 B1 | 3/2015 | Lussier et al. | |

(Continued)

FOREIGN PATENT DOCUMENTS

WO 98/40264 A1 9/1998

*Primary Examiner* — Truc M Do
(74) *Attorney, Agent, or Firm* — Richard M. Goldberg

(57) ABSTRACT

A method to cultivate a piece of farmland with an autonomous agricultural vehicle including an engine and an endless track to support the vehicle on the piece of farmland and to propel the vehicle over the farmland by transferring power from the engine to the endless track, and a tensioning system for adjusting the longitudinal tension in the endless track, the method including the steps of, during cultivating the piece of farmland, controlling the vehicle to move over the piece of farmland following a predetermined path including multiple consecutive sub-sections; for one or more of these sub-sections, determining the power transferred from the engine to the endless track at the one or more sub-sections; and using the tensioning system to adjust the longitudinal tension in the endless track on the basis of the power transferred at the one or more subsections.

14 Claims, 2 Drawing Sheets

(56) References Cited

U.S. PATENT DOCUMENTS

| | | | |
|---|---|---|---|
| 2010/0106344 A1 | 4/2010 | Edwards et al. | |
| 2012/0242142 A1* | 9/2012 | Kautsch | B62D 55/14 |
| | | | 305/165 |
| 2015/0344087 A1* | 12/2015 | de Boe | B62D 55/244 |
| | | | 305/142 |
| 2017/0113742 A1* | 4/2017 | Tratta | B62D 55/08 |
| 2017/0308091 A1 | 10/2017 | Bunderson et al. | |
| 2018/0258610 A1* | 9/2018 | Elkins | E02F 3/841 |
| 2019/0146513 A1* | 5/2019 | Tomita | B60W 30/10 |
| | | | 701/50 |
| 2020/0107484 A1* | 4/2020 | Brindyuk | A01B 79/02 |
| 2021/0129927 A1* | 5/2021 | Lussier | B62D 55/14 |
| 2021/0362791 A1* | 11/2021 | West | B62D 55/065 |
| 2022/0172466 A1* | 6/2022 | Snyder | G06T 7/20 |
| 2023/0042085 A1* | 2/2023 | Turcotte | B62D 55/244 |

* cited by examiner

METHOD TO CULTIVATE A PIECE OF FARMLAND WITH AN AUTONOMOUS AGRICULTURAL VEHICLE AND A VEHICLE TO APPLY THE SAID METHOD

GENERAL FIELD OF THE INVENTION

The present invention pertains in general to autonomous vehicles for autonomously crossing and cultivating farmland. In particular, the invention pertains to a method to cultivate a piece of farmland with an autonomous agricultural vehicle which comprises an endless track to support the vehicle on the piece of farmland and to propel the vehicle over the farmland by transferring power from the engine to the endless track.

BACKGROUND OF THE INVENTION

The adoption of technology in agriculture has improved the approaches that farmers use in the farmland nowadays. Modern agriculture has made it easy for farmers to achieve high produce while using less input. According the trends in the use of technology in agriculture, there are high concerns that the future of agriculture is bright. For example, mechanization in agriculture has reduced the overuse of manpower in doing some of the farming activities. As a consequence, agricultural machines have become bigger and bigger and more dedicated towards performing one type of cultivation. The introduction of autonomous vehicles (also denoted as autonomous tractors) is considered a next step into the future of farming and it is expected that using autonomous tractors, the trend of bigger and more dedicated (specialised) farming machines will continue.

Self-driving cars are common these days. Based on the trends in regards to the advancement of technology, it is expected that the technology will also be used for cultivating farmland. At present farmers in advanced countries are giving a tactical approach to how they plant, harvest, as well as maintain their crops. A good example of new tactical approaches is the use of autonomous tractors in agriculture. The concept of autonomous tractors can be traced back prior to the introduction of the concept of precision farming in the eighties. During these days, farmers used GPS technology as a guide to the tractors across the farmland. The aim of such an approach was the reduction of fuel consumption and enhancing the efficiency of the tractors and the farming activities. As such, these initial steps formed the basis for the development of autonomous tractors, following the introduction of technologies that improved communication over wireless devices. Autonomous tractors employ much the same approach as the driverless vehicles, i.e. using advanced control systems and sensors. With the inclusion of auto-steering abilities, such tractors have added control abilities. Evidently, the launch of the autonomous tractors is considerably a manifestation of the extended use of technology in farming.

Benefits to farmers are obvious. It is an undeniable fact that farming is not an easy undertaking, it involves working for long hours and the subscription to hard labor in harsh weather conditions. Taking into consideration the common state of farmers, the majority of them have no employees to task them in the farmland and hence, have to do everything all by themselves. The autonomous tractors can be a positive outcome. Next to this, accuracy and precision are important aspects in agriculture in various aspects such as planting. Regarding for example such planting, the autonomous tractors can be equipped with automatic planting systems that ensure high accuracy when planting. With such abilities, farmers are assured of seed conservation. All in all, the use of such tractors may lead to higher return on investment since accuracy is enhanced.

One of the factors that hinder agricultural production in both developed and developing countries is the lack of enough labor. Normally, farmers grow a small section of land which they are sure to manage with their limited labor. However, with the adoption of the autonomous tractors, the problem of labor insufficiency is catered for since the number of employees needed to cultivate the farmland may be reduced.

It is generally recognized that data plays a significant role in determining the farmers' decisions. Usually, the absence of clear and reliable data can interfere with the decisions farmers make, and subsequently, have adverse impacts on the amount of outcome obtained from the fields. There are diverse sources and types of data that a farmer needs to succeed in their farming activities. For example, data on soil is important in that it helps farmers in determining what crops will do well in a given piece of land by establishing the moisture content, and the amount of nutrients. The autonomous tractors can be fitted with various sensors that can be used in the collection of data on the conditions of the soil, and hence, offer a platform for improving the outcome of the available crops. The elimination of the human interaction in farming following the use of autonomous tractors may thus be advantageous. Stressed employees cannot achieve the required efficiency level in the fields. Similarly, it is often hard for humans to manage diverse tasks on the farm especially where a large farmland is involved. Autonomous tractors have the appropriate sensors to offer the necessary help in the management of a several tasks in the farmland hence reducing stress and the workload in the farm.

The autonomous tractors run on high level technology that can be used in gathering high profile information. For example, some models have automatic steering abilities and GPS technologies which enhance the control of the tractors' course. The advanced sensors come in handy in the determination of soil moisture level, activities around planting and harvesting, present yield, as well as the amount of fuel needed for a given area of land. Additionally, other models of autonomous tractors can guide farmers on how to apply fertilizers.

Autonomous tractors allow precise control of work and farm equipment. This makes it possible for farmers to extend their working hours. The sensors fitted in the tractors can guide it in the right course even in conditions of reduced visibility and at night: work continues even during windy, dusty, and foggy conditions. Additionally, the ability of the tractors to reduce workload and stress on employees comes in handy in increased working hours in a day since the farmer has a greater flexibility in the management of growing tasks.

A common type of autonomous vehicle comprises one or more endless tracks (e.g. metal chain tracks, or rubber belts) for supporting and driving the vehicle. Such tracks are in particular suitable for crossing farmland. Typically, the transfer of power from the engine of the vehicle to the track is accomplished by a drive wheel, or drive sprocket, driven by the engine and engaging with holes in the track links or with pegs on them to drive the track. In some vehicles, the drive wheel is mounted well above the contact area on the ground, allowing it to be fixed in position. In agricultural crawlers it is normally incorporated as part of the bogie. Placing suspension on the sprocket is possible, but is mechanically more complicated. A non-powered wheel, an idler, is placed at the opposite end of the track, primarily to tension the track, since loose track could be easily thrown (slipped) off the wheels. To prevent throwing, the inner surface of the track links usually have vertical guide horns engaging grooves, or gaps between the doubled road and idler/sprocket wheels. Some track arrangements use return rollers to keep the top of the track running straight between the drive sprocket and idler. Others, called slack track, allow the track to droop and run along the tops of large road wheels. Track tension is typically maintained by a track adjuster. This is needed because when the track tension is too high, there is increased wear on all undercarriage components, such as pins, bushings, links, and sprockets. However, track tension being too low is even more disadvantageous. This may result in the track swinging side to side, causing machine weaving and increased wear on all components involved in track guidance (such as flanges, roller guards, link side faces, and sprocket teeth). Upper waviness causes the track to whip which may result in excessive wear on the idler and carrier roller. High speeds will increase the damage. In reverse, the sprocket may climb or skip bushings, causing loud, popping impacts and potentially excessive noise and shaking. Thus, track tension is typically maintained at a high level in order to prevent the disadvantageous accompanied when the track tension is low. Various tracked vehicles and system for maintaining track tension are known form the art.

U.S. Pat. No. 5,373,909 (assigned to Byron Enterprises Inc) discloses a tracked vehicle for agricultural harvesting which reduces damage to fields and can be driven on paved roads at reasonable speeds. The vehicle has front and rear tracks, linked by an articulating joint which permits turning and rotation of one track with respect to the other. Each track is propelled by a pair of tracked power units which are hydraulically driven by a heavy duty differential between the units. Each unit includes an endless elastomeric track which has two rows of lugs on its inner surface. A drive mechanism engages these lugs to propel the vehicle. There is a mechanism for maintaining tension in the endless tracks, including a hydraulic tensioning cylinder.

WO 98/40264 (assigned to Caterpillar Inc) describes a work machine being driven by a rubber belted track. The work machine has opposite sides and is comprised of a frame defining a front portion and a rear portion. An engine is positioned on the frame. A roller frame is connected at each of the opposite sides of the work machine. The roller frame includes a main support member having an idler wheel positioned near an end and a drive wheel positioned near the other end. A front hardbar is positioned on each of the opposite sides of the work machine. The front hardbar has a first end portion attached to the frame near the front portion and a second end portion is connected to a respective one of the roller frames. A rear hardbar is positioned on each of the opposite sides of the work machine. The rear hardbar has a first end portion attached to the frame near the rear portion, and a second end portion is connected to a respective one of the pair of roller frames. A pair of tracks is individually positioned on each opposite side of the work machine and defines a pair of sides. The individual track is entrained about the respective roller frame. The roller frame is positioned within the pair of sides. A tensioning system is operatively interposed the idler wheel and the drive wheel.

U.S. Pat. No. 4,854,650 (assigned to Caterpillar Inc) describes a recoil and tensioning assembly for the track and idler of a self-laying track vehicle, which assembly maintains a constant tensioning force on the endless track. The assembly provides recoiling of the idler wheel during shock loading of the idler wheel or during ingestion of foreign material between the track and the idler and drive wheels. The recoil and tensioning assembly includes a recoil member which telescopes into a cylinder and includes a first chamber filled with a compressible gas and a second chamber filled with a non-compressible oil. A floating piston separates the two chambers and serves to compress the gas during a recoil cycle. The recoil and tensioning assembly incorporates a compressible gas spring in instead of a large coil steel spring, thereby requiring less space, less weight, and easier assembly and disassembly.

US 2021/0362791 discloses an agricultural tracked vehicle including an electric motor, an idler wheel, a drivable track engaged with the idler wheel, and an actuator that is electrically powered by the electric motor and configured to move the idler wheel to adjust the tension in the drivable track based on the torque output of the electric motor. This way the tension in the track is continuously adjusted based on the actual power output of the motor.

OBJECT OF THE INVENTION

It is an object of the invention to devise a method employing an autonomous agricultural vehicle as defined here above, which leads to improved efficiency and less wear of the track and its driving system. It is another object of the invention to devise a vehicle that is suitable for employing this method.

SUMMARY OF THE INVENTION

In order to meet the object of the invention, a method to cultivate a piece of farmland with an autonomous agricultural vehicle as defined here above has been devised, wherein the vehicle further comprises a tensioning system for adjusting the longitudinal tension in the said endless track, the method comprising: during cultivating the piece of farmland, controlling the vehicle to move over the piece of farmland following a predetermined path comprising multiple consecutive sub-sections, and for one or more of these sub-sections, determining the said power transferred from the engine to the endless track at the one or more sub-sections, and using the tensioning system to adjust the longitudinal tension in the said endless track on the basis of the said power transferred at the one or more subsections, wherein the autonomous vehicle cultivates the piece of farmland according to a predetermined cultivation plan, wherein the power is determined by calculation before the start of the cultivation based on the cultivation plan.

The inventors recognised that a very high tension in the track not only leads to high wear of the track, but also to excessive power needed to drive the track. Next to this, it was recognised that only when high power is needed to drive the track to move the vehicle, high tension is advantageous in the track. When less power is needed, the tension may also be less while still providing reliable movement of the vehicle without running the risk of wear and other disadvantages that accompany a too low track tension (or better: a tension that is too low for the power transferred to the track). This led to the insight that it is advantageous to adjust the tension in the track to the momentary power needed to actually propel the vehicle. Thus, the tension may be adjusted continuously when the vehicle moves over the piece of farmland. This is particularly advantageous for an autonomous vehicle since such a vehicle crosses the farmland following a predetermined path, allowing to (largely) determine beforehand what the amount of power needed at each section of this path is (since data about the land, speed, cultivation operation, routing etc is known), and thus also to determine the needed tension beforehand (not excluding any on-site finetuning). This way, the planning can be such that a reliable cultivation operation with minimal wear of the track (and driving components) can be combined with maximal efficiency of the vehicle.

In addition to the above, it was also found by the inventors that it is advantageous to determine the power by calculation before the start of the cultivation, based on the cultivation plan. It has become a common understanding that the best way for using an autonomous tractor is to establish beforehand, a cultivation plan to cultivate the piece of land, which plan for examples defines the routing and speed of the tractor over the land, as well as the way the actual agricultural implement (which may be part of the vehicle or coupled to a tractor to form the vehicle) is operated (for example its driving speed, its height with respect to the land, its angle with respect to the land etc.), and using for example a sensor technology to adapt this predetermined plan to the particular circumstances of the moment in time the land is actually cultivated. Such circumstances can for example be objects that were not present at the piece of land at the time the plan was made, the weather conditions, etc. Thus, preferably together with appropriate sensor technology, it is commonly believed that one can completely pre-plan the cultivation operation. This on it turn means that the power transferred from the engine to the endless track along any path of the predetermined cultivation plan can also be calculated beforehand, e.g. using average values or estimated values for parameters that are not certain such as the weather conditions. It was found that this leads to a more stable adjustment of the track tension (all adjustments can be pre-programmed, instead of continuously reacting to actual measurement of the power) and thereby even less wear.

The invention is also embodied in an autonomous agricultural vehicle for cultivating a piece of land, the vehicle comprising an engine and an endless track to support the vehicle on the piece of farmland and to propel the vehicle over the farmland by transferring power from the engine to the endless track, wherein the autonomous vehicle further comprises a tensioning system for adjusting the longitudinal tension in the said endless track, the vehicle comprising a processing unit to control the vehicle during cultivating the piece of farmland, to move over the piece of farmland following a predetermined path comprising multiple consecutive sub-sections and to determine for one or more of these sub-sections the said power transferred to the endless track at these one or more sub-sections, the vehicle further comprising a tensioning system to adjust the longitudinal tension in the said endless track on the basis of the said power transferred to the endless track at these one or more subsections, wherein control unit is programmable to control the autonomous vehicle to cultivate the piece of farmland according to a predetermined cultivation plan, wherein the power is determined by calculation before the start of the cultivation based on the cultivation plan, instead of by actually measuring the power.

The invention also pertains to a combination of the vehicle as described here above, and a remote processing unit that is operatively connected to the vehicle, characterised in that the power is determined by calculation in the remote processing unit and send to the control unit of the vehicle before the start of the cultivation.

It is noted that U.S. Pat. No. 8,985,250 (assigned to Camoplast Solideal Inc) describes a method and system for a vehicle with an endless track, wherein the tension and power are adjusted to one another. However, in this known method the tension is (indirectly) determined, using a sensor that measures the magnitude of force applied by a drive wheel to the track to drive the track, and then this measured tension is used to regulate the power transferred to the track to keep the torque produced below a predetermined level. This is to prevent too high track tension. Thus, the system is controlled by the actual track tension, and the power of the engine is adapted to this. For an autonomous vehicle this is very disadvantageous since the power may be become too low for performing an operation as planned, or even moving across the farmland and thus, the actual operation has to be adjusted, potentially leading to lower quality cultivation, prolonged cultivation times or even sections where the cultivation cannot be performed at all by the autonomous vehicle.

Definitions

A tractor is an agricultural vehicle that is used cultivate land, typically by pulling or carrying agricultural machinery, and to provide the energy needed for the machinery to cultivate the land. It commonly, but not necessarily, is a powerful vehicle with a gasoline or electric engine and large rear wheels or endless (belt) tracks, also called caterpillar tracks, i.e. an endless belt (e.g. of linked metal elements) fastened around the wheels of a vehicle to help it to move over a surface, in particular rough land.

An autonomous vehicle is a vehicle that can move over a piece of land according to a predetermined cultivation plan without a human operator controlling its movement. Such a vehicle can automatically perceive its environment, make decisions based on what it perceives and recognizes, and then actuate a movement or manipulation within that environment. These decision-based actions may include, but are not limited to, starting, stopping, and maneuvering around obstacles that are in its way. Such a vehicle can cross farmland without needing continuous control of a human operator, and thus is able to autonomously cultivate the land.

Farmland is land that is used for or suitable for farming.

Longitudinal tension in an endless track, also denoted simply as "track tension", is the tension in the track in the direction of movement.

Consecutive means following one after the other in order (so not concurrently), but not necessarily implying that consecutive features are adjoining (i.e. share a common border).

An operator of a machine or device is a human person that is trained to control this machine or device.

A cultivation plan for a tractor to cultivate a piece of land, is a plan which defines at least the position, direction and speed of the tractor when crossing the land such that the land in essence can be cultivated completely.

Automatic means without the need of (human) operator intervention. The term automatic does not exclude that something is operator initiated or operator stopped as long the process can be completed without needing operator intervention.

EMBODIMENTS OF THE INVENTION

In a first further embodiment of the method according to the invention, in addition to the determination of the power by calculation based on the cultivation plan, the actual power transferred is measured. It was found that no matter how precise the calculation is, given the fact that some parameters cannot be known beforehand exactly, or that unpredictable events may occur, fine tuning of the track tension adjusting is preferred. For this, in addition to the determination of the power by calculation based on the cultivation plan, the actual power transferred is measured when cultivating the piece of farmland. In yet a further preferred embodiment only when the measured power differs for more than a predetermined threshold value from the calculated power, the tension is adjusted on the basis of the measured power. This is advantageous for preventing over-adjusting which may lead to an unstable cultivation operation and hence too much wear.

In yet another embodiment of the method according to the invention, in which embodiment the vehicle comprises two endless tracks at opposite lateral sides of the vehicle to support the vehicle on the piece of farmland and to propel the vehicle over the farmland, and wherein the engine transfers power to both of the endless tracks, the method comprises adjusting the longitudinal tension in both of the endless tracks. It was found that it is advantageous to apply the method also for vehicles that comprise two tracks, wherein for each track the tension may be adjusted. The engine in this embodiment (and for the vehicle and method of the invention in its broadest sense) may be one central engine (e.g. gasoline or electric engine) with proper connections to each of the tracks, but it may be also a group of sub-engines that work together to propel the vehicle and drive an agricultural implement. The latter is more common when using electric engines. In that case, a separate sub-engine may be used for each of the tracks and for driving the implement. Preferably, the tension in each track can be adjusted independently of the tension in the other track.

In another embodiment of the method according to the invention, during cultivating the piece of farmland, for each consecutive sub-section of the predetermined path the power is determined and the tensioning system is used to adjust the longitudinal tension in each of these sub-sections. So in this embodiment, in each of the sub-sections the power is determined and the tension adjusted accordingly. Although it is foreseen that only in the most critical sub-sections of the path the method is applied, it has been found that it is advantageous to simply apply the method in each of the sub-sections. This increases reliability and efficiency while minimising wear. Preferably, the consecutive sub-sections form the path in a continuous manner, i.e. the sub-sections are contiguous and together form the path in a continuous manner, meaning that the path is not interrupted by a "non sub-section" area.

In yet another embodiment the said power is determined by measuring the said power at the one or more sub-sections. Actually measuring the power that is transferred to the track for propelling the vehicle has been found to be an advantageous means to determine that power. The power can be measured directly or indirectly by measuring a unit that has a known relationship to the said power. For example, when the engine is an electric engine, the power can be measured by determining the voltage and current needed to provide the said power. The power can then be calculated using the voltage and current as measured.

In yet again another embodiment the autonomous vehicle comprises a tractor and operatively coupled thereto an agricultural machine for performing the cultivation operation.

In still again another embodiment the said endless tracks is toothed rubber belt. These belts have been found to be ideally suitable for agricultural vehicles, combining sufficient strength with high efficiency and reliable running.

In another embodiment the tensioning system comprises a hydraulic cylinder that applies a force on the said endless track in radial direction to adjust the longitudinal tension. This tensioning system as such is known form the art but has been found to be ideally suitable in the present method since it is capable for efficient, responsive and reliable adjusting of the track tension.

It is noted that any and all embodiments as described here above or exemplified here after in the examples section for the method according to the invention can also be embodied in the vehicle according to the invention.

The invention will now be further illustrated using the following specific examples.

DETAILED DESCRIPTION

FIG. 1

Figure 1:
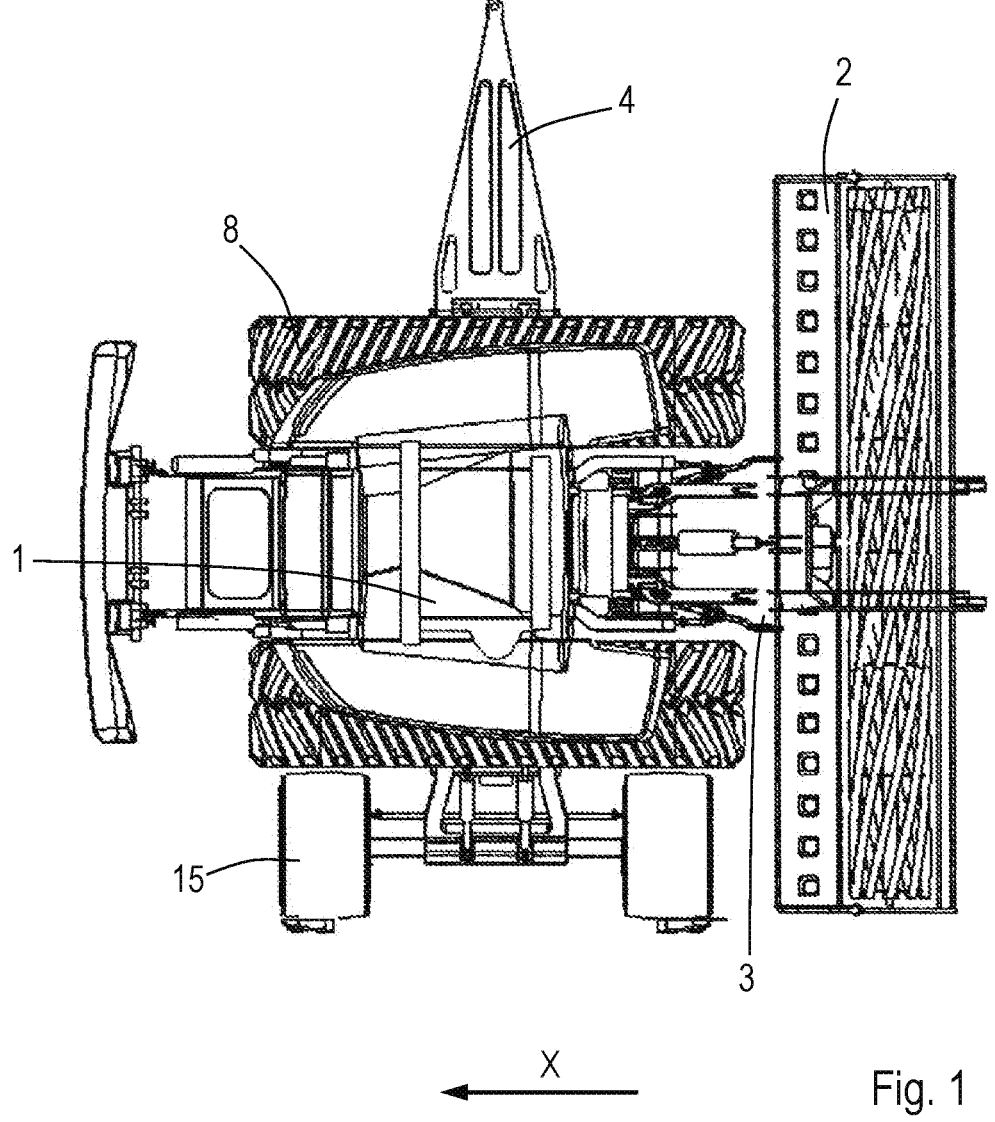
FIG. 1 schematically shows an autonomous vehicle with endless tracks.

FIG. 1 is a schematic top plan view of an autonomous vehicle for autonomously crossing farmland. Such a vehicle as such is known from the art, and described in detail in WO2020/106142 (assigned to Agxeed Holding BV). In particular, the vehicle crosses the farmland in the direction indicated as X. The vehicle comprises a tractor 1 and at its trailing end, coupled to this tractor via common triangle coupler 3, a power harrow 2 for performing the actual agricultural operation. The triangle has standard dimensions and drive axle such that various common agricultural machines can be coupled to the tractor. During the autonomous crossing of the farmland in direction X, the power harrow rests on the land for cultivating it. The tractor has an engine (not depicted in FIG. 1) which drives this harrow and the wheels 8 (in this case endless tracks in the form of toothed rubber belts, reinforced with steel wires). In this embodiment the engine is an electric engine that comprises three sub-engines: a first sub-engine to drive the implement 2, and two separate sub-engines connected to each of the endless tracks 8 for independently driving these tracks (see FIG. 2 for more details). When the engine runs, it is able to transfer power to the wheels 8, to turn the tracks in order impose a movement of the autonomous tractor over the surface of the piece of farmland to be cultivated.

For making sure the vehicle is not principally hindered by any obstacles, the front side of the tractor is provided with several sensors (not depicted) for detection of such obstacles when crossing the farmland. Laterally, the tractor is provided with a drawbar 4 and opposite thereof, with a second set of wheels 15. The drawbar and second set of wheels are not in use when the vehicle crosses the farmland. They serve to help in transporting the vehicle over the road. To enable this, the drawbar can be used for connecting the tractor to a road haulage truck for transport of the vehicle over the road, whereas the set of wheels 15 acts to provide rolling support as described in the '142 patent application mentioned here above.

FIG. 2

Figures 2, 3, 4:
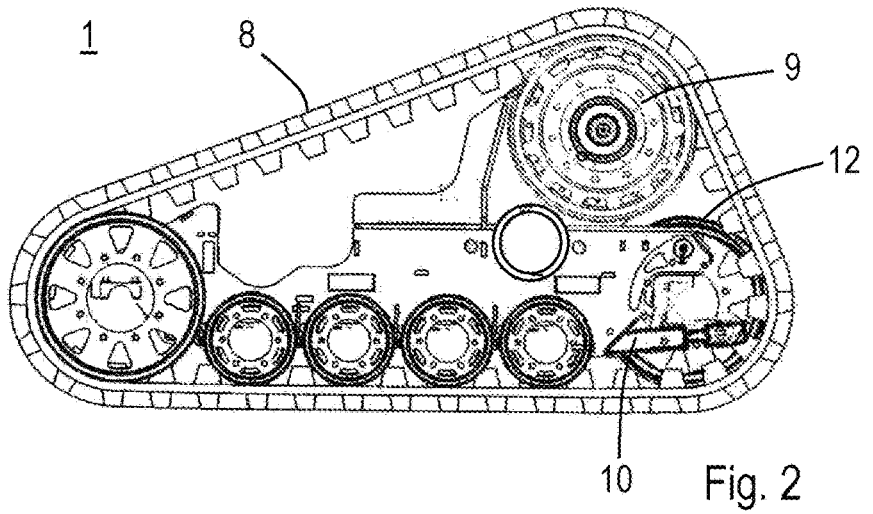
FIG. 2 schematically shows a side view of the vehicle of FIG. 1.
FIG. 3 schematically shows a predetermined path for cultivation, divided in sub-sections.
FIG. 4 schematically shows a control diagram for the vehicle of FIG. 1.

FIG. 2 schematically shows a side view of the tractor 1 of FIG. 1. In this side view the rubber track tension 8 is depicted, as well as electric engine 9 that drives the track 8 via a mechanical connection using lugs as commonly known in the art. Also depicted is a hydraulic cylinder 10 that is arranged to apply a force on the said endless track 8 in radial direction by pushing against wheel 12. This way, the longitudinal tension in the track can be adjusted. By pushing the wheel 12 further outwardly, the tension in the track increases.

FIG. 3

FIG. 3 schematically shows a predetermined path 101 for cultivation, divided in sub-sections 102 and 103. This path 101 is a part of a predetermined cultivation plan to cultivate the piece of farmland 100. The path comprises multiple consecutive sub-sections, in this case sub-sections 102 that define straight parts of the path 101, and sub-sections 103 that define the head sections for turning the vehicle. Together, the sub-sections form the complete path 101 in a continuous manner.

The plan comprises to determine beforehand, based on the data regarding the piece of farmland, the type of agricultural implement, the operation needed, speed, direction and other conditions (weather, condition of the soil etc), the power needed to be transferred to each of the tracks to follow the predetermined path. For the straight sub-sections 102, the power needed is less than for the curved sub-sections 103. Correspondingly, the track tension is higher for the curved sections than for the straight sections. During the actual cultivation operation, in addition to the determination of the power by calculation based on the cultivation plan as described here above, the actual power transferred by each of the electric sub-engines to each of the tracks 8 is measured by measuring the voltage and current needed to drive the respective track. If the measured power for one or both of the tracks at a particular sub-section differs for more than a predetermined threshold value from the calculated power, the predetermined tension is fine-tuned on the basis of the measured power.

FIG. 4

FIG. 4 schematically shows a control diagram for the vehicle of FIG. 1, showing in combination the vehicle of FIG. 1, and a remote processing unit 51 that is operatively connected to the vehicle. The tractor 1 has a central processing unit 11, that is connected (wired or wireless; this is the same for any other connection in FIG. 4) to power determination assembly 5, hydraulic cylinder 10 and electric engine 9. The CPU controls the engine when cultivating a piece of farmland according to the predetermined cultivation plan that was made at a remote location 50, using computer 54 and dedicated software. The computer is connected to a remote processing unit (indicated as "Server") 51 that on its turn is connected to CPU 11. The tractor operates normally under the control of CPU 11 (which might also be present at a remote location, thus not being part of the actual tractor, or distributed over the tractor and one or more remote locations). The conditions for the cultivation plan are established at location 50 as well and stored in memory 52. In this memory, different sets of conditions are stored that correspond e.g. to safety regulations. Depending for example on the type of tractor, the type of cultivation, the type of farmland (size, proximity to urban areas, etc), the weather conditions, a particular set of conditions can be chosen to be used for the operation. Memory 53 holds multiple distinct sets of conditions for implements to be connected to the tractor.

In operation, when cultivating the farmland, the assembly 5 continuously determines the power transferred by the engine 9 to its track 8 (not depicted in FIG. 4). If it is determined that it is needed to adjust the track tension to this measured power, the hydraulic cylinder 10 is controlled to adjust the track tension.

What is claimed is:

1. A method to cultivate a piece of farmland with an autonomous agricultural vehicle, the autonomous agricultural vehicle comprising an engine and an endless track to support the autonomous agricultural vehicle on the piece of farmland and to propel the autonomous agricultural vehicle over the farmland by transferring power from the engine to the endless track, wherein the autonomous agricultural vehicle further comprises a tensioning system for adjusting the longitudinal tension in the endless track, the method comprising the steps of:

during cultivating the piece of farmland, controlling the autonomous agricultural vehicle to move over the piece of farmland following a predetermined path comprising multiple consecutive sub-sections;

for one or more of these sub-sections, determining the power transferred from the engine to the endless track at the one or more sub-sections;

using the tensioning system to adjust the longitudinal tension in said endless track on the basis of said power transferred at the one or more subsections;

wherein the autonomous agricultural vehicle cultivates the piece of farmland according to a predetermined cultivation plan; and determining the power by calculation before the start of the cultivation based on the cultivation plan.

2. A method according to claim 1, further comprising the step of, in addition to the determination of the power by calculation based on the cultivation plan, measuring the actual power transferred.

3. A method according to claim 2, further comprising the step of, when the measured power differs for more than a predetermined threshold value from the calculated power, adjusting the tension on the basis of the measured power.

4. A method according to claim 1, wherein the vehicle comprises two endless tracks at opposite lateral sides of the autonomous agricultural vehicle to support the autonomous agricultural vehicle on the piece of farmland and to propel the autonomous agricultural vehicle over the farmland, and wherein the engine transfers power to both of the endless tracks, and further comprising the step of adjusting the longitudinal tension in both of the endless tracks.

5. A method according to claim 4, further comprising the step of adjusting the tension in each track independently of the tension in the other track.

6. A method according to claim 1, further comprising the step of, during cultivating the piece of farmland, for each consecutive sub-section of the predetermined path, determining the power and using the tensioning system to adjust the longitudinal tension in each of these sub-sections.

7. A method according to claim 6, wherein the consecutive sub-sections form the path in a continuous manner.

8. A method according to claim 1, further comprising the step of determining said power by measuring said power at the one or more sub-sections.

9. A method according to claim 8, wherein the engine is an electric engine, and further comprising the step of measuring the power by determining the voltage and current needed to provide said power.

10. A method according to claim 1, wherein the autonomous agricultural vehicle comprises a tractor and operatively coupled thereto is an agricultural machine for performing the cultivation operation.

11. A method according to claim 1, wherein the endless track includes a toothed rubber belt.

12. A method according to claim 1, wherein the tensioning system comprises a hydraulic cylinder that applies a force on the endless track in a radial direction to adjust the longitudinal tension.

13. An autonomous agricultural vehicle for cultivating a piece of farmland, the vehicle comprising:

an engine, an endless track to support the autonomous agricultural vehicle on the piece of farmland and to propel the autonomous agricultural vehicle over the farmland by transferring power from the engine to the endless track, a processing unit to control the autonomous agricultural vehicle during cultivating the piece of farmland, to move over the piece of farmland following a predetermined path comprising multiple consecutive sub-sections and to determine for one or more of these subsections the power transferred to the endless track at these one or more sub-sections, a tensioning system to adjust the longitudinal tension in the said endless track on the basis of the power transferred to the endless track at these one or more sub-sections, wherein the processing unit is programmable to control the autonomous agricultural vehicle to cultivate the piece of farmland according to a predetermined cultivation plan, and wherein the power is determined by calculation before the start of the cultivation based on the cultivation plan.

14. A combination of the autonomous agricultural vehicle according to claim 13, and a remote processing unit that is operatively connected to the autonomous agricultural vehicle, wherein the power is determined by calculation in the remote processing unit and sent to the control unit of the autonomous agricultural vehicle before the start of the cultivation.

\* \* \* \* \*